Figure 1:
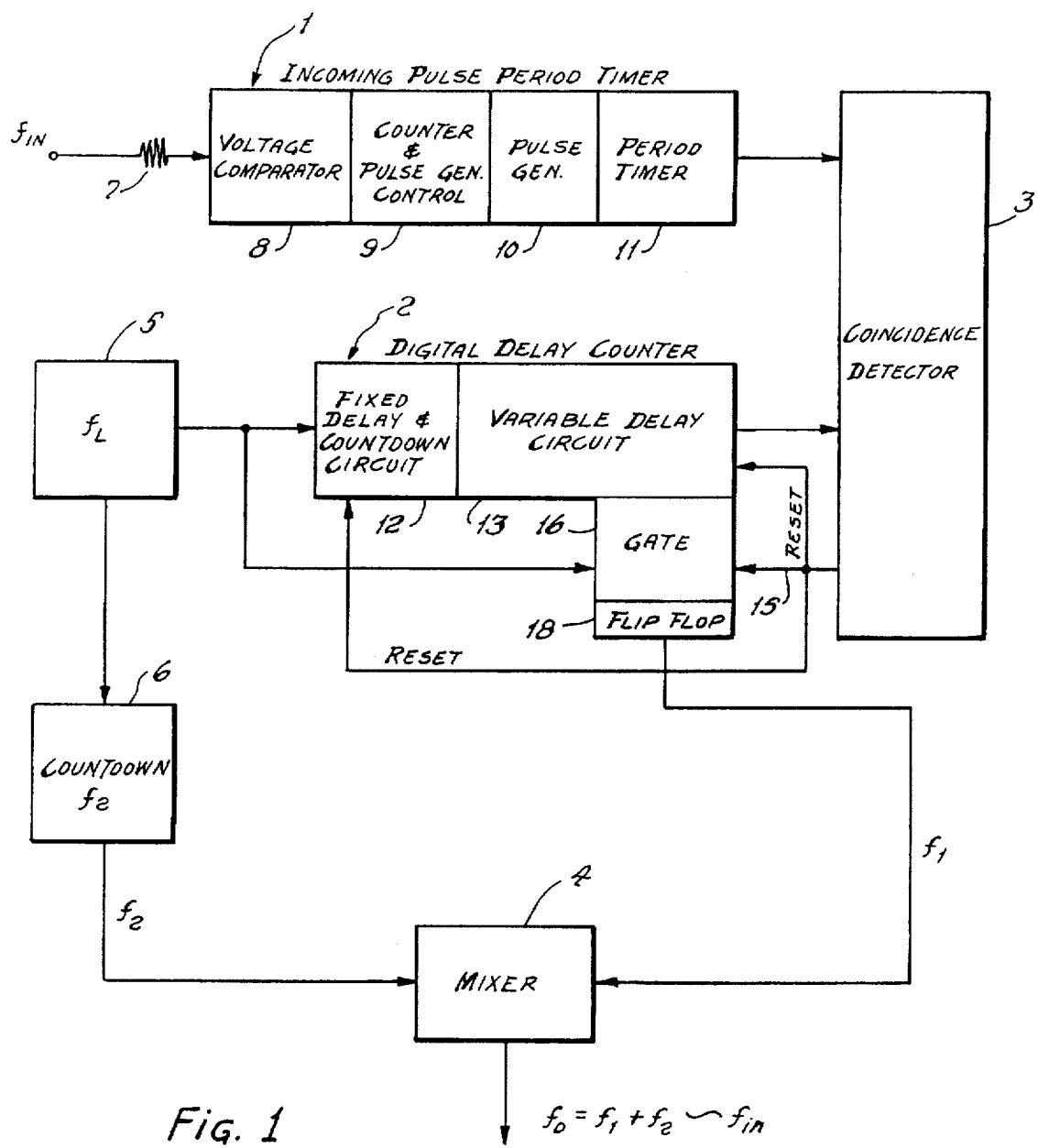

United States Patent [19]

Foss et al.

[11] Patent Number: 5,689,474

[45] Date of Patent: Nov. 18, 1997

[54] DIGITAL FREQUENCY SYNTHESIZER

[75] Inventors: Rene N. Foss; Michael W. Manchester, both of Seattle, Wash.

[73] Assignee: The United States of America, as represented by the Secretary of the Navy, Washington, D.C.

[21] Appl. No.: 768,226

[22] Filed: Oct. 15, 1968

[51] Int. Cl.$^6$ .................................................. H04K 3/00
[52] U.S. Cl. ............................ 367/1; 367/135; 367/137; 367/141; 310/337
[58] Field of Search .................. 340/3, 3 E, 3 S, 340/5, 5 D, 1 C, 3 D; 343/17.7; 35/10.4; 181/5 B; 367/1, 135, 136, 137, 141; 310/337

[56] References Cited

U.S. PATENT DOCUMENTS 3,206,684  9/1965  Der et al. ...................... 343/17.7 X
3,277,476 10/1966  Sabin et al. ....................... 343/17.7
3,280,937 10/1966  Faber, Jr. et al. ..................... 181/5 B

*Primary Examiner*—J. Woodrow Eldred
*Attorney, Agent, or Firm*—Frank G. Nieman; Thomas E. McDonald; Robert K. Tendler

[57] ABSTRACT

There is disclosed a digital frequency synthesizer which converts an ultrasonic burst from an echo-ranging sonar system into a continuous signal having a frequency exactly equal to the frequency of the cycles making up the burst. This burst is detected and a number representing the period of this burst generated and transmitted to a first counter. A clock pulse train is generated and transmitted to a second counter. When the numbers in the first and second counters coincide, a single output pulse is generated and the second counter reset. When this cycle is repeated, the frequency of the resultant pulse train reflects any change in frequency of the cycles making up the bursts.

3 Claims, 2 Drawing Sheets

DIGITAL FREQUENCY SYNTHESIZER

The invention described herein may be manufactured and used by or for the Government of the United States of America for governmental purposes without the payment of any royalties thereon or therefor.

This invention relates to target simulation by a mobile antisubmarine warfare target and, more particularly, to a digital frequency synthesizer used as part of an on-board target simulator which produces a prolonged signal in response to short ultrasonic received from an echo-ranging sonar system. These prolonged signals are used in simulating the return signal from a massive such as a ship hull.

In the more advanced sonar systems, ultrasonic bursts are used to seek out large aquatic targets. Each of these bursts consists of a short series of ultrasonic waves or cycles which make up a single pulse of energy. When these bursts are reflected by an underwater target, the length, amplitude and frequency of the returned bursts indicate the target's size, aspect and relative speed.

By generating an elongated or continuous signal when an incoming burst is sensed, a target simulator can return a burst to simulate a return signal from a vessel having large physical dimensions. This return signal is generated in such a manner that it has a frequency exactly equal to the frequency of the burst. The prolonged carrier of the returned signal is generated by the subject digital frequency synthesizer to be described later in detail. This carrier is basically a CW signal having a frequency exactly matching that of the incoming burst. This CW signal is later gated, modulated and frequency-shifted in accordance with the length or aspect of the vessel to be simulated and, subsequently, transmitted back to the echo-ranging sonar gear.

In to assure a one-to-one correlation between the frequency of the ultrasonic burst and the frequency of the CW signal, a digital conversion technique is utilized. This conversion is accurately accomplished by detecting the burst and generating in a first counter a number representing the period of this burst. A clock pulse train is simultaneously generated and transmitted to a second counter. When the numbers in the first and second counters coincide, a single output pulse is formed and the second counter reset. The second counter then is made to again count up to the number in the first counter at a rate set by the frequency of the clock pulse train. When coincidence is again reached, another output pulse is generated. This recycling creates an output pulse train having a period equal to the length of time it takes to generate in the second counter the number stored in the first counter. As the number in the first counter is varied in response to a change in frequency of the burst, the period of this output pulse train is varied. This output pulse train is heterodyned with a third pulse train to form a signal which accurately tracks the frequency of the incoming burst.

It is therefore an object of this invention to generate a signal of predetermined duration having a frequency exactly equal to the frequency of an ultrasonic burst received from an echo-ranging sonar system.

It is another object of this invention to prolong the duration of short pulses made up of ultrasonic waves by generating a continuous signal whose frequency corresponds to that of the cycles of the incoming pulses.

Figure 2:
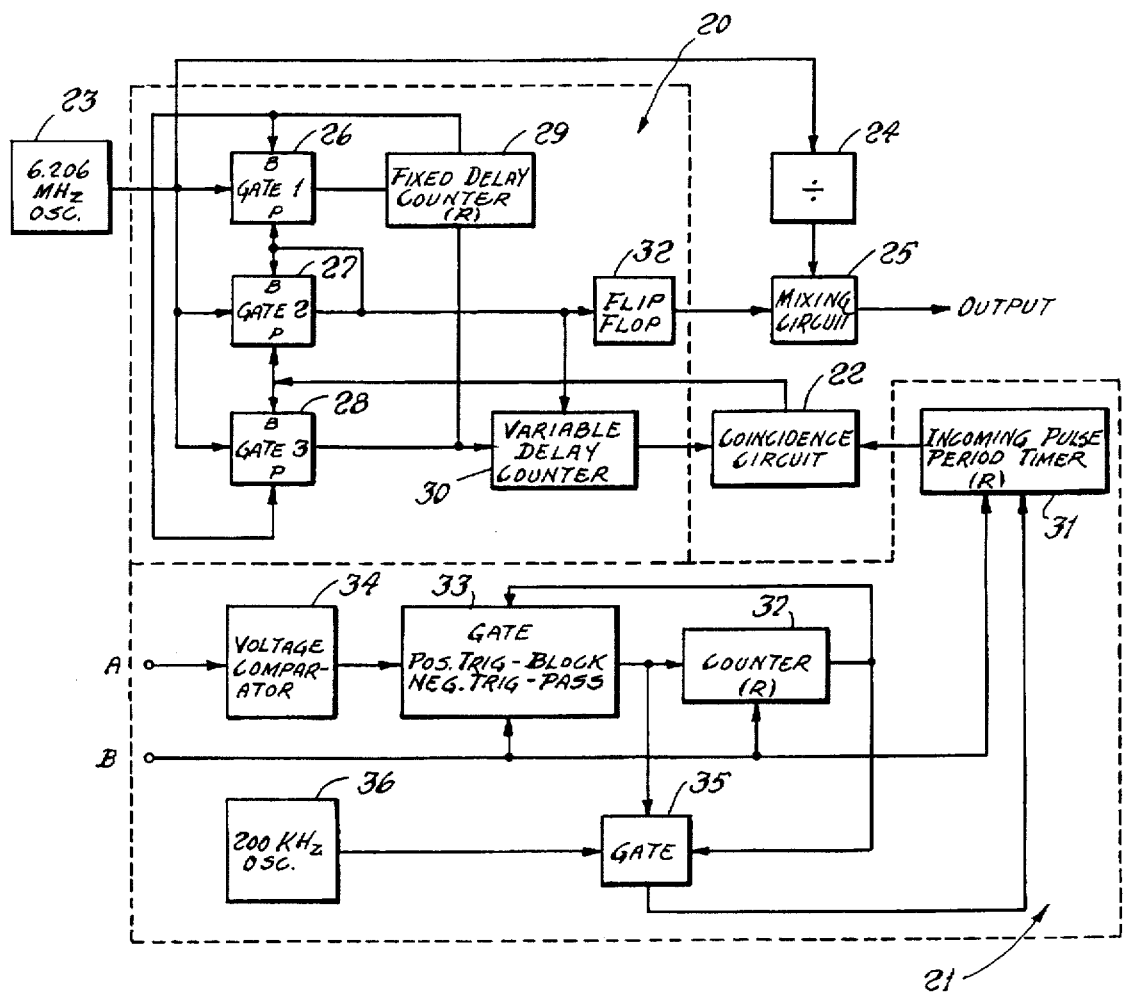

Other objects, advantages and novel features of the invention will become apparent from the following detailed description thereof when considered in conjunction with the accompanying drawings in which like numerals represent like parts throughput and wherein:

FIG. 1 is a block diagram showing the cooperation of the major subsystems of the digital frequency synthesizer; and FIG. 2 is a schematic diagram of the synthesizer which includes a more detailed showing of the digital delay counter and incoming pulse period timer shown in FIG. 1.

Referring to FIG. 1, the digital frequency synthesizer is divided into two subsystems. These two major subsystems are an incoming pulse period timer 1, which detects an ultrasonic burst and generates a signal representing a period proportional to the frequency of this burst, and a digital delay counter 2, which synthesizes a signal having a period which can be varied in response to this proportional period. It is thus also proportional to the period of the incoming burst. This synthesized signal is subsequently heterodyned with another signal to produce a signal having the same frequency as that of the incoming ultrasonic burst.

The coincidence of the number representing the period of the burst and the number generated by the digital delay counter is determined by coincidence detector 3. When the coincidence is sensed, the digital delay counter by the recycling action mentioned above generates a signal $f_1$ and transmits it to a mixer 4 where it is mixed with a signal from a local oscillator 5 to form a signal with a frequency equal to that of the cycles in the incoming burst. The signal from oscillator 5 to the mixer is first fed through countdown circuit 6 which divides the frequency of the local oscillator by a predetermined amount and produces a signal having a frequency $f_2$ which, when heterodyned with the signal $f_1$ from the digital delay counter, provides a continuous signal having a frequency exactly equal to the frequency of the ultrasonic burst.

Referring now to the operation of the incoming pulse period timer subsystem, the period timer receives an ultrasonic burst 7 which has a frequency $f_{in}$. The first portion of this timer is a voltage comparator 8 which functions as a threshold detector. This comparator establishes a threshold for incoming signals so that only bursts exceeding a certain amplitude will be utilized by the system. These bursts are then fed to a cycle counter 9 which counts the number of zero crossovers of the waves in the incoming ultrasonic burst. This counter also serves as a control for pulse generator 10. This pulse generator is a fixed frequency oscillator which is turned on when the first wave or cycle of the burst is received and turned off after a certain number of zero crossovers of the ultrasonic waves in the burst have been counted. It is thus allowed to run for a time proportional to the period of the incoming tone burst. It will be appreciated that the number of pulses from this generator represents a period proportional to that of the incoming pulse. The output of this generator is then passed to a period timer 11 which is a six-stage binary counter. This counter counts the number of pulses generated by the passage of an ultrasonic burst through the system and generates a binary number corresponding to the length of time of the period of the individual cycles in the incoming signal. This binary number is then stored as one of the inputs to coincidence detector 3 which is generally a series of AND/OR gates.

The other subsystem feeding the coincidence detector, digital delay counter 2, is also fed by local oscillator 5. The frequency of this oscillator is first divided by a predetermined amount by fixed delay and countdown circuit 12. This circuit is basically a counter which transmits a pulse only after a certain number of pulses from the local oscillator have been counted. The fixed delay counter is cut off and pulses from local oscillator 5 are gated to variable delay circuit 13 which counts these pulses until coincidence occurs, at which time the flip-flop 18 is triggered. The variable delay counter is variable in the sense that a number may already be stored in its counter storage. Thus, when this counter is counting up to the number stored in the coincidence detector, it need not start at "0" but may start at a number between "0" and the number already in the coincidence detector. It will be appreciated that by raising the number in the variable delay counter, less time will be necessary to count up to the stored number. The period of the aforementioned output pulse train will thus be reduced to a point where it can be successfully heterodyned. If the approximate frequency of the incoming pulse is known, the variable delay counter may be preset.

The variable delay counter is allowed to count pulses until coincidence is obtained with the binary number from period timer 11. When the coincidence detector senses matching numbers, it activates gate 16 to allow the next pulse from local oscillator 5 to activate flip-flop 18. It also resets the fixed delay and countdown circuit 12 and variable delay circuit 13 so that the cycle may start again. The period of the pulses produced at the output of flip-flop 18 will be twice the fixed delay time plus the time it takes for the variable delay counter to build up its count. Since this count must match the count from period timer 11, the period of the output signal from flip-flop 18 will vary directly with the period timer count once the variable delay counter has been properly set. In the preferred case, the frequency of the output signal from the flip-flop will be proportionally lower than the frequency of the incoming burst. By a proper setting of $f_L$ and pulse generator 10, the output of the flip-flop may be heterodyned with a pulse train having a fixed frequency. This later pulse train is shown as the output of countdown circuit 6. It is mixed at 4 with the output of flip-flop 18 to form a continuous signal having a frequency exactly equal to the frequency of the incoming burst.

FIG. 2 is a detailed schematic of the digital frequency synthesizer. Shown in this figure are the detailed schematics of the digital delay counter 2 and incoming pulse timer 1.

As recited in FIG. 1, the digital delay counter feeds one portion of the coincidence detector. This circuitry is shown encompassed in dotted outline 2 in FIG. 2.

The operation of this delay counter is as follows: Master oscillator 5 feeds directly gates 1, 2 and 3 being numbered 26, 27 and 28, respectively. The letters "B" and "P" at each of these gates refer to inputs for blocking and passing the signals fed to each of the gates. Assuming gate 1 is in the pass state, pulses from the master oscillator operating at 6.206 MHZ are fed into the fixed delay counter 29. In the desired configuration, the 353rd pulse into this counter causes an output pulse to be produced which switches gate 1 to a block state and gate 3 to pass state. The next oscillator pulse resets the fixed delay counter at R and is fed into variable delay counter 30 along with succeeding oscillator pulses. These succeeding pulses are blocked from proceeding to the fixed delay counter until an output signal is produced by gate 2. Thus, all of the succeeding pulses are fed directly from the master oscillator to the counter until the counter is full. This counter is a six-stage binary counter whose output may be varied by presetting it. This binary output of the variable digital counter is one of the inputs to coincidence detection 3. When coincidence occurs with the input from incoming pulse period timer 11, a signal is fed to gates 2 and 3. This signal blocks gate 3 and sets gate 2 to the pass condition. At this point a pulse from the master oscillator passes through gate 2 to flip-flop 18 and is mixed with a countdown signal from the master oscillator. This pulse also changes gate 1 from a block condition to a pass condition and gate 2 from a pass to a block condition to set up the initial conditions of the three gates. Thus, after coincidence occurs and gates 2 and 3 are appropriately switched, the oscillator pulse feeds through gate 2, blocks it, opens gate 1, resets the variable delay counter and toggles the output flip-flop. The circuit is now ready to repeat this sequence beginning with the next oscillator pulse. It will be appreciated that the train of oscillator pulses through gate 2 will be counted down by 353 plus an amount equal to the number set by the variable delay counter.

The result of this sequence is a continuous square wave from the output flip-flop, the basic period of which is equal to twice the sum of the fixed delay time plus the variable delay time. The output period can range from a minimum when the variable delay counter is set to zero, to a maximum when this counter is set to a count of 63. The output period signal can thus be adjusted to any one of the sixty-four possible times by varying the state of this counter.

The incoming pulse period timer which feeds the other half of the coincidence detector 3 is shown by the dotted 1 in FIG. 2. A positive square timing pulse at B, generated by a burst detector (not shown), is initiated by an incoming ultrasonic burst. This pulse resets the incoming pulse period timer 11 and counter 37 while at the same time blocking gate 33 for the duration of the pulse. This blocking assures that no part of the burst signal appearing at A will reach the timing counter before the entire system is reset. Upon completion of this timing pulse, gate 33 allows the signal at A to be fed through the voltage comparator 8 into countered 37. This signal consists of a series of ultrasonic waves contained in a received burst. Counter 37 responds to the zero crossover of these waves and produces an output pulse for the 101st crossover. This output pulse is thus an effective measure of the average period of the waves in the ultrasonic burst and is directly proportional thereto. The first wave of the pulse through gate 33 opens gate 35 which remains open until the output from the 101st cycle counter closes it. Into gate 35 is fed a 200 $H_Z$ signal from pulse generator 10. For a period corresponding to the time it takes for the counter to build up 101 pulses, the 200 $KH_Z$ pulses from pulse generator 10 are fed through gate 35 into the incoming pulse period timer. The 101st pulse through the cycle counter then blocks gate 35 to shut off the stream of 200 $KH_Z$ pulses. The 101st cycle counter also transmits its output pulse to gate 33 to block it. This prevents spurious or overlapping signals from being counted. Gate 33 will remain blocked until another ultrasonic burst is detected as indicated by the passage of another positive square pulse from B.

When gate 35 is finally blocked by the 101st cycle from the cycle counter, there is in the period timer a binary representation of a signal representing the incoming signal period. It is this binary number that must be matched by the output of the variable delay counter.

Choice of oscillator frequencies and the fixed delay time in counter 29 provide a one-to-one correlation of the change in input frequency at A with the change in output frequency from the output flip-flop. With the proper choice of a variable delay time, a short duration, ultrasonic burst appearing at A and B causes a continuous signal to be generated at the output of flip-flop 18. The output of this flip-flop is heterodyned with a counted-down signal from the master oscillator to produce the required CW signal. This countdown circuit is shown at 6 and, in the preferred embodiment, transmits the 512th pulse received from the master oscillator. This counted-down signal is then heterodyned with the signal from flip-flop 18 at mixing circuit 4. The frequency of the output of the mixing circuit thus bears an exact relationship to the frequency of the input signal.

Obviously many modifications and variations of the present invention are possible in the light of the above teachings.

What is claimed is:

1. A system for converting an incoming ultrasonic burst produced by a sonar transmitter into a prolonged signal, having a frequency equal to that of the individual cycles making up said burst, comprising means for generating a first train of pulses having a first predetermined repetition rate;

a first register for counting the number of said pulses which occur during a predetermined fixed number of individual cycles in each ultrasonic burst, thereby producing in said register a number which is directly proportional to the frequency of the individual cycles from each burst;

means for generating a second train of pulses having a second predetermined repetition rate;

a second register;

means for feeding said second train of pulses to said second register;

means for producing a single output pulse and for resetting said second register to a predetermined number each time the counts in said first and second registers are equal, whereby repeated counting cycles produce a series of output pulses having a frequency proportional to that of the cycles in each burst;

means for deriving from said second train of pulses a third train of pulses having a third predetermined repetition rate; and means for mixing said output pulses with said third pulse train to produce a prolonged signal having a frequency equal to that of the cycles in said ultrasonic burst.

2. The system as recited in claim 1 wherein said second repetition rate is higher than said first repetition rate and wherein said third repetition rate is proportional to said second repetition rate.

3. The system as recited in claim 1 wherein the number to which said second register is preset is variable from "0" to the number in said first register.

* * * * *